United States Patent [19]

Zebrowski

[11] 4,221,595

[45] Sep. 9, 1980

[54] INSULATING HOT TOPPING MATERIAL

[75] Inventor: Gerald R. Zebrowski, Twinsburg, Ohio

[73] Assignee: Ferro Corporation, Cleveland, Ohio

[21] Appl. No.: 624,696

[22] Filed: Oct. 22, 1975

[51] Int. Cl.$^3$ .............................................. C04B 35/52
[52] U.S. Cl. ...................................................... 106/56
[58] Field of Search ............................................ 106/56

[56] References Cited

U.S. PATENT DOCUMENTS

| | | | |
|---|---|---|---|
| 1,674,961 | 6/1928 | Diamond | 106/56 |
| 2,772,176 | 11/1956 | Leitten | 106/56 |
| 3,770,466 | 11/1973 | Wilton | 106/56 |
| 3,775,140 | 11/1973 | Visser et al. | 106/56 |
| 3,892,584 | 7/1975 | Takeda et al. | 106/56 |

*Primary Examiner*—James Poer
*Attorney, Agent, or Firm*—Milton L. Simmons

[57] ABSTRACT

An insulating hot topping material including a refractory filler material, an optional light weight insulating filler material and a finely divided particulate carbonaceous material. Dust inhibitors may also be included in the form of a liquid hydrocarbon and/or a fiber material.

2 Claims, No Drawings

INSULATING HOT TOPPING MATERIAL

BACKGROUND OF THE INVENTION

Certain metals shrink upon solidication from the liquid state. If unchecked this property leads to the formation of undesirable internal cavaties or pipe when such metals are formed or poured into foundry castings or primary ingots. As is well-known in the art, it is desirable to provide a reservoir of molten metal above a casting or ingot to feed the void created as the body of the casting or ingot solidifies. This reservoir is known as a riser in the production of foundry castings and is referred to as a hot top in the production of primary ingots. A further function of the riser or hot top is to act as a collector for the chemical segregates, such as carbon and sulfur in the case of ferrous metals, which tend to stay in the liquid phase and accumulate in the area of final solidification. It is common practice to provide a covering of exothermic or insulating powder over the riser or hot top to minimize heat loss through the upper surface. These powders are commonly referred to as hot topping compounds.

Traditionally, people have tended to use exothermic materials for hot topping. These exothermic materials ignite, burn and give off heat. After the exothermic hot topping has completed it's burn, it leaves an insulating residue. The exothermic materials are generally made from aluminum dross which is of inconsistant composition and contains a variety of impurities. These exothermic hot topping materials will smoke when burning which is objectionable, and may also give off toxic and pungent fumes. The insulating hot topping materials (non-exothermic) have been used to a lesser extent. Materials such as perlite, vermiculite, rice hulls, wheat hulls, etc., have all been used as insulating hot top materials. But these materials are relatively inefficient insulators so that the largest part of the market has been exothermic.

SUMMARY OF THE INVENTION

It has been found according to the present invention that it is possible to use materials of lower refractory properties in conjunction with a carbonaceous material to yield insulating hot topping compositions of very low density and heat capacity and superior high temperature insulating properties at a reasonable cost. The addition of a finely divided carbonaceous material to an insulating material that would otherwise be unsatisfactory for use at molten metal temperatures increases the refractoriness of the insulating material and permits it's use as a hot topping material. The carbon acts as a non-wettable coating both at the metal-powder interface and between individual semi-refractory particles preventing fusion and fluxing. Other features and advantages of the invention will be apparent from the description which follows.

DETAILED DESCRIPTION OF THE PREFERRED EMBODIMENTS

The insulating hot topping material of the present invention comprises a refractory filler and a carbonaceous material. Materials to reduce the release of dust and a light weight insulating filler may also be included.

Refractory fillers which would otherwise be unsatisfactory for use at molten metal temperatures are used in the present invention due to the inclusion of the carbonaceous material. The carbon acts as a non-wettable coating both at the metal-powder interface and between individual refractory filler particles preventing fusion and fluxing. A further advantage of the carbon is that the carbon itself is a highly refractory material that possesses superior insulating properties in the powder state.

Oxidation of the carbon, which might be expected, proceeds very slowly because of the general deficiency of oxygen in the area and oxidation losses of carbon during the solidification period are found to be minimal. One reason that carbon containing materials have not been used in the industry is concern that the carbon would leach or dissolve into certain metals, particularly low carbon, high alloy steels. This is not the case in the present invention. It is believed that because of the low bulk density of the hot topping material, there is a minimal contact zone between the carbon and molten metal at the metal-powder interface. This allows very little carbon to actually come into contact with the molten metal. In addition, the carbon powder is not readily wetted by the molten metal.

The preferred carbonaceous material is finely ground petroleum coke because it is an inexpensive source. However, other carbon sources can be used provided it has a high fixed carbon content and a low sulfur content (below about 3% and preferably below 1%). Some examples of other carbon sources are bituminous coke and pitch coke or any other form of carbon such as carbon black and graphite. The preferred particle size for the carbonaceous material is minus 100 mesh but it could be as coarse as about minus 20 mesh. Carbonaceous materials having a high volatile content cannot be used since volatilization upon contact with the molten metal would cause a violent boiling action. Whatever carbon source is used, the amount is adjusted so that the fixed carbon content of the final mixture is between about 4% and 50% by weight, preferably about 40%. The lower percentage of carbonaceous material is for primary steel production or other cases where it is desirable to keep the carbon content to a minimum. For foundry castings where carbon segregation occurs in the riser and carbon inclusion in the final product is less likely to occur, the higher percentages of carbonaceous materials are used because the carbon is a good insulator and has a high refractoriness.

The filler material of the present invention is composed of a refractory filler preferably in combination with a light weight insulating filler. The refractory filler comprises the major portion of filler. The preferred refractory filler is fly ash because it is inexpensive, although other equivalent fillers may be used such as aluminum silicates (clays, kyanite, etc.), fumed silica, bauxite, magnesia, grog, limestone, dolomite and wollastonite. The refractory filler is pulverized preferably to minus 100 mesh although it could be as coarse as minus 14 mesh if desired. Generally the refractory filler is selected from those fillers having a high fusion temperature and thus a high refractoriness, preferably with a minimum fluid temperature of about 2200° F.

The light weight insulating filler is selected from those fillers which are less refractory than the refractory fillers and which have a low density, a high insulation value and a low heat capacity. These light weight insulating fillers include expanded perlite, expanded vermiculite, diatomaceous earth, pumice, expanded shale and bloated clay. The preferred light weight insulating filler is perlite because of it's low cost and would generally have a particle size rating of minus 16 mesh.

Large particles would be undesirable because they would tend to segregate and very fine particles would be too dusty.

Preferably included in the composition is a material which will prevent dusting, i.e. prevents dust from being given off when the material is thrown on the molten metal. This is normally any hydrocarbon that will dampen the material and prevent dusting and which will not volatilize to any significant extent during storage. Examples are kerosene and coal oil.

One specific example of the present invention is as follows:

| Component | Preferred % By Weight | Range % By Weight |
|---|---|---|
| Fly Ash | 46 | 30 –82 |
| Perlite | 13 | 0 –25 |
| Petroleum Coke | 40 | 4 –50 |
| Kerosene | 1 | 0 –3 |

Other specific examples are as follows:

| Component | % By Weight |
|---|---|
| Fly Ash | 67 |
| Calcined Diatomaceous Earth | 25 |
| Petroleum Coke | 8 |

| Component | % By Weight |
|---|---|
| Fly Ash | 65 |
| Calcined Diatomaceous Earth | 25 |
| Bituminous Coke | 10 |

In this latter example a larger amount of bituminous coke is used than petroleum coke because bituminous coke has a lower fixed carbon content.

Another embodiment of the invention employs fibers as a means of maintaining the integrity of the insulating layer such as on a large surface when wind might create dusting. Examples of fibers which can be used are ceramic fibers such as aluminum silicate fibers, silica fibers, glass fibers, wollastonite fibers, slag wool and mineral wool. The fibers are preferably less than one quarter inch in length and usually much smaller. The amount of fiber used will depend on the length of the fibers and should be such that the fibers will not impede the flow of the material but sufficient to maintain the integrity of the insulating layer under the prevailing conditions after the kerosene or any other similar material has volatilized. It should be noted that these fibers will also serve as the refractory filler as long as the fibers are short enough. An example would be as follows:

| Component | % By Weight |
|---|---|
| Wollastonite Fibers | 47.5 |
| Wollastonite Particles | 47.5 |
| Petroleum Coke | 5.0 |

The composition of the present invention is formed by mixing the ingredients in any desired type of dry mixing apparatus or blender and then package for shipment and storage.

As previously indicated, the insulating hot topping material of the present invention makes use of refractory and insulating filler materials which could not otherwise be used for hot topping. Thus their high insulating values and or relatively low densities may be used to advantage. This is because of the inclusion of the carbonaceous material as explained. These insulating hot topping materials have performed better than most exothermics in use without the attendant disadvantages of exothermics as pointed out above. They are low in density and less weight has to be used for each application as compared to exothermics because of the high insulating value. The materials of the invention produce a minimal chilling effect because of the low density and low heat capacity. The materials are consistent in composition and do not generate any objectionable smoke or fumes.

What is claimed is:

1. A particulate insulating hot topping material consisting essentially of:
   a. from 30 to 82% by weight of a refractory filler;
   b. from 0 to 25% by weight of a light weight insulating filler;
   c. from 4 to 50% by weight of a carbonaceous material;
   d. from 0 to 3% by weight of a liquid hydrocarbon dust inhibitor;
   e. a quantity of fiber dust inhibitor sufficient to maintain the integrity of said hot topping material.

2. A particulate hot topping material as recited in claim 1 wherein said fiber is selected from the group consisting of aluminum silicate fibers, silica fibers, glass fibers, wollastonite fibers, slag wool and mineral wool.

* * * * *